(12) United States Patent
Akimoto (10) Patent No.: US 8,041,502 B2
(45) Date of Patent: Oct. 18, 2011

(54) ENGINE MISFIRE DETECTION APPARATUS FOR INTERNAL COMBUSTION ENGINE AND ENGINE MISFIRE DETECTION METHOD

(75) Inventor: Hikokazu Akimoto, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 962 days.

(21) Appl. No.: 11/922,995

(22) PCT Filed: Jun. 28, 2007

(86) PCT No.: PCT/JP2007/062974
§ 371 (c)(1),
(2), (4) Date: Dec. 28, 2007

(87) PCT Pub. No.: WO2008/015860
PCT Pub. Date: Feb. 7, 2008

(65) Prior Publication Data
US 2010/0114460 A1    May 6, 2010

(30) Foreign Application Priority Data

Jul. 31, 2006    (JP) .................................. 2006-208074

(51) Int. Cl.
G06F 19/00 (2006.01)
G01M 15/00 (2006.01)
G01L 5/26 (2006.01)

(52) U.S. Cl. .................... 701/111; 73/114.04; 73/114.26
(58) Field of Classification Search ............. 123/406.14, 123/406.24, 406.27, 436; 701/101–103, 701/111, 114, 115; 73/114.02–114.12, 114.25, 73/114.26; 702/182, 183
See application file for complete search history.

(56) References Cited

U.S. PATENT DOCUMENTS

| | | | |
|---|---|---|---|
| 5,440,921 A * | 8/1995 | Matsuno et al. | 701/111 |
| 5,544,058 A * | 8/1996 | Demizu et al. | 123/406.27 |
| 5,979,407 A * | 11/1999 | Wang et al. | 123/436 |
| 6,530,360 B1 * | 3/2003 | Kondo | 123/406.27 |
| 6,801,848 B1 * | 10/2004 | Mathews | 701/111 |
| 7,503,207 B2 * | 3/2009 | Nishigaki et al. | 73/114.02 |

(Continued)

FOREIGN PATENT DOCUMENTS

JP    04076250 A *    3/1992 ................. 73/114.07

(Continued)

*Primary Examiner* — Willis R Wolfe, Jr.
(74) *Attorney, Agent, or Firm* — Kenyon & Kenyon LLP (57) ABSTRACT

The engine misfire detection process according to one aspect of the invention first makes tentative detection on the occurrence or the non-occurrence of an engine misfire in execution of both vibration control and rotation speed control. In response to the tentative detection of an engine misfire, the engine misfire detection process subsequently makes final detection on the occurrence or the non-occurrence of an engine misfire. In the event of no final detection of an engine misfire, the engine misfire detection process makes tentative detection and final detection on the occurrence or the non-occurrence of an engine misfire in prohibition of the vibration control. In the event of still no final detection of an engine misfire, the engine misfire detection process makes tentative detection and final detection on the occurrence or the non-occurrence of an engine misfire in further prohibition of the rotation speed control. Even in the event of no final detection of an engine misfire in execution of both the vibration control and the rotation speed control, the procedure of the invention makes final detection on the occurrence or the non-occurrence of an engine misfire in prohibition of execution of the vibration control and further the rotation speed control. This arrangement desirably increases the detection frequency of engine misfires.

10 Claims, 6 Drawing Sheets

U.S. PATENT DOCUMENTS

| | | | |
|---|---|---|---|
| 7,503,208 B2 * | 3/2009 | Akimoto et al. | 73/114.03 |
| 7,665,558 B2 * | 2/2010 | Akimoto et al. | 123/406.27 |
| 2009/0158829 A1 * | 6/2009 | Suzuki | 73/114.26 |

FOREIGN PATENT DOCUMENTS

| | | |
|---|---|---|
| JP | 10-318033 | 12/1998 |
| JP | 2000-110655 | 4/2000 |
| JP | 2000-252-332 | 9/2000 |
| JP | 2000-240501 | 9/2000 |
| JP | 2000-352332 A | 12/2000 |
| JP | 2001-065402 | 3/2001 |
| JP | 2001-317402 | 11/2001 |
| JP | 2006-194099 | 7/2006 |
| JP | 2006-194124 | 7/2006 |

* cited by examiner

ENGINE MISFIRE DETECTION APPARATUS FOR INTERNAL COMBUSTION ENGINE AND ENGINE MISFIRE DETECTION METHOD

This is a 371 national phase application of PCT/JP2007/062974 filed 28 Jun. 2007, which claims priority to Japanese Patent Application No. 2006-208074, filed 31 Jul. 2006, the contents of which are incorporated herein by reference.

TECHNICAL FIELD

The present invention relates to an engine misfire detection apparatus for an internal combustion engine and a corresponding engine misfire detection method. More specifically the invention pertains to an engine misfire detection apparatus of detecting a misfire of an internal combustion engine and a corresponding engine misfire detection method in a power output apparatus that includes the internal combustion engine having an output shaft linked to a driveshaft and a motor enabling input and output of power from and to the output shaft of the internal combustion engine and ensures output of at least part of output power of the internal combustion engine to the driveshaft under vibration control of controlling the motor to reduce a vibration caused by operation of the internal combustion engine.

BACKGROUND ART

One proposed structure of the engine misfire detection apparatus includes an internal combustion engine and a motor generator connected to an output shaft of the internal combustion engine. In the failure of accurate detection of misfires of the internal combustion engine according to a driving condition of a vehicle, this prior art engine misfire detection apparatus restricts or prohibits the detection of misfires of the internal combustion engine (see Patent Document 1). The restriction or prohibition of the detection of misfires in the internal combustion engine in the event of failed detection of the engine misfires with high accuracy according to the driving condition of the vehicle aims to prevent wrong detection of misfires in the internal combustion engine.

Patent Document 1: Japanese Patent Laid-Open No. 2001-317402

DISCLOSURE OF THE INVENTION

This prior art engine misfire detection apparatus effectively prevents wrong detection of misfires in the internal combustion engine by restricting or prohibiting the detection of misfires in the internal combustion engine in the event of failed detection of the engine misfires with high accuracy according to the driving condition of the vehicle. The prohibition of the detection of misfires in the internal combustion engine naturally reduces the frequency of detection of engine misfires. The reduced frequency of detection of engine misfires, however, interferes with a quick response to an engine misfire. In the engine misfire detection apparatus for the internal combustion engine, a sufficiently high frequency of detection of engine misfires is thus desirable. In the engine misfire detection apparatus for the internal combustion engine, adequate detection of engine misfires is also desirable.

In an engine misfire detection apparatus for an internal combustion engine and a corresponding engine misfire detection method, there would thus be a demand for increasing a detection frequency of engine misfires in the internal combustion engine. In the engine misfire detection apparatus for the internal combustion engine and the corresponding engine misfire detection method, there would also be a demand for ensuring adequate detection of engine misfires in the internal combustion engine.

The present invention accomplishes at least part of the demands mentioned above by the following configurations applied to an engine misfire detection apparatus for an internal combustion engine and a corresponding engine misfire detection method.

One aspect of the invention pertains to an engine misfire detection apparatus of detecting a misfire of an internal combustion engine in a power output apparatus that includes the internal combustion engine having an output shaft linked to a driveshaft and a motor enabling input and output of power from and to the output shaft of the internal combustion engine and ensures output of at least part of output power of the internal combustion engine to the driveshaft under vibration control of controlling the motor to reduce a vibration caused by operation of the internal combustion engine. The engine misfire detection apparatus includes: a rotational position detector that detects a rotational position of the output shaft of the internal combustion engine; a unit angle rotation time calculator that computes a unit angle rotation time required for rotation of the output shaft of the internal combustion engine by every predetermined unit rotation angle according to the detected rotational position; an engine misfire tentative detection module that makes tentative detection on occurrence or non-occurrence of a misfire in the internal combustion engine based on the computed unit angle rotation time; a first engine misfire final detection module that, in response to the tentative detection of a misfire in the internal combustion engine by the engine misfire tentative detection module, makes final detection on the occurrence or the non-occurrence of a misfire in the internal combustion engine based on the computed unit angle rotation time; and a second engine misfire final detection module that, in the event of no final detection of a misfire in the internal combustion engine by the first engine misfire final detection module, outputs prohibition of execution of the vibration control and, after the prohibition of execution of the vibration control, makes final detection on the occurrence or the non-occurrence of a misfire in the internal combustion engine based on the computed unit angle rotation time.

The engine misfire detection apparatus according to this aspect of the invention makes tentative detection on the occurrence or the non-occurrence of a misfire in the internal combustion engine, based on the unit angle rotation time that is required for rotation of the output shaft of the internal combustion engine by every predetermined unit rotation angle and is computed according to the rotational position of the output shaft of the internal combustion engine. In response to the tentative detection of a misfire in the internal combustion engine, the engine misfire detection apparatus makes final detection on the occurrence or the non-occurrence of a misfire in the internal combustion engine, based on the computed unit angle rotation time. In the event of no final detection of a misfire in the internal combustion engine, the engine misfire detection apparatus outputs prohibition of execution of the vibration control and, after the prohibition of execution of the vibration control, makes final detection on the occurrence or the non-occurrence of a misfire in the internal combustion engine, based on the computed unit angle rotation time. Even in the case of no final detection of a misfire in the internal combustion engine in execution of the vibration control, the engine misfire detection apparatus makes final detection on the occurrence or the non-occurrence of a misfire in the internal combustion engine in non-execution of the vibration control. This arrangement desirably increases the detection frequency of misfires in the internal combustion engine.

In one preferable application of the engine misfire detection apparatus according to the above aspect of the invention, the engine misfire tentative detection module makes tentative detection on the occurrence or the non-occurrence of a misfire in the internal combustion engine based on the computed unit angle rotation time and a preset first threshold value, and the second engine misfire final detection module, after the prohibition of execution of the vibration control, makes tentative detection on the occurrence or the non-occurrence of a misfire in the internal combustion engine based on the computed unit angle rotation time and a preset second threshold value that is different from the first threshold value, and in response to the tentative detection of a misfire of the internal combustion engine, makes final detection on the occurrence or the non-occurrence of a misfire in the internal combustion engine based on the computed unit angle rotation time. This arrangement ensures adequate tentative detection on the occurrence or the non-occurrence of a misfire in the internal combustion engine, depending upon execution or non-execution of the vibration control. In one preferable embodiment of the engine misfire detection apparatus in the above application, the engine misfire tentative detection module successively calculates a first difference between a current unit angle rotation time computed at a current position of the output shaft and a previous unit angle rotation time computed at a previous position of the output shaft that is a first rotational position before the current position and makes tentative detection of a misfire in the internal combustion engine when any of the successively calculated first differences is greater than the first threshold value, the first engine misfire final detection module specifies the first difference that is greater than the first threshold value as an object first difference and makes final detection of a misfire in the internal combustion engine when a ratio of a selected first difference among the successively calculated first differences to the object first difference is in a preset first range, and the second engine misfire final detection module, after the prohibition of execution of the vibration control, successively calculates a second difference between a current unit angle rotation time computed at a current position of the output shaft and a previous unit angle rotation time computed at a previous position of the output shaft that is the first rotational position before the current position, makes tentative detection of a misfire in the internal combustion engine when any of the successively calculated second differences is greater than the second threshold value, and in response to the tentative detection of a misfire in the internal combustion engine, specifies the second difference that is greater than the second threshold value as an object second difference and makes final detection of a misfire in the internal combustion engine when a ratio of a selected second difference among the successively calculated second differences to the object second difference is in a preset second range that is different from the first range. This arrangement ensures adequate final detection on the occurrence or the non-occurrence of a misfire in the internal combustion engine, depending upon execution or non-execution of the vibration control.

In another preferable application of the engine misfire detection apparatus according to the above aspect of the invention, the power output apparatus performs rotation speed control of controlling the motor to adjust a rotation speed of the internal combustion engine. The engine misfire detection apparatus of this application further has a third engine misfire final detection module that, in the event of no final detection of a misfire in the internal combustion engine by the second engine misfire final detection module, outputs prohibition of execution of the rotation speed control and, after the prohibition of execution of the rotation speed control, makes final detection on the occurrence or the non-occurrence of a misfire in the internal combustion engine based on the computed unit angle rotation time. Even in the case of no final detection of a misfire in the internal combustion engine in execution of the rotation speed control, the engine misfire detection apparatus makes final detection on the occurrence or the non-occurrence of a misfire in the internal combustion engine in non-execution of the rotation speed control. This arrangement desirably increases the detection frequency of misfires in the internal combustion engine.

In still another preferable application of the engine misfire detection apparatus according to the above aspect of the invention, the power output apparatus performs rotation speed control of controlling the motor to adjust a rotation speed of the internal combustion engine, the engine misfire tentative detection module makes tentative detection on the occurrence or the non-occurrence of a misfire in the internal combustion engine based on the computed unit angle rotation time and a preset first threshold value, and the second engine misfire final detection module, after the prohibition of execution of the vibration control, makes tentative detection on the occurrence or the non-occurrence of a misfire in the internal combustion engine based on the computed unit angle rotation time and a preset second threshold value that is different from the first threshold value, and in response to the tentative detection of a misfire of the internal combustion engine, makes final detection on the occurrence or the non-occurrence of a misfire in the internal combustion engine based on the computed unit angle rotation time. The engine misfire detection apparatus of this application further has a third engine misfire final detection module that, in the event of no final detection of a misfire in the internal combustion engine by the second engine misfire final detection module, outputs prohibition of execution of the rotation speed control, makes tentative detection on the occurrence or the non-occurrence of a misfire in the internal combustion engine based on the computed unit angle rotation time and a preset third threshold value that is different from the first threshold value and the second threshold value after the prohibition of execution of the rotation speed control, and in response to the tentative detection of a misfire in the internal combustion engine, makes final detection on the occurrence or the non-occurrence of a misfire in the internal combustion engine based on the computed unit angle rotation time. This arrangement ensures adequate tentative detection on the occurrence or the non-occurrence of a misfire in the internal combustion engine, depending upon execution or non-execution of the vibration control and upon execution or non-execution of the rotation speed control. In one preferable embodiment of the engine misfire detection apparatus in this application, the engine misfire tentative detection module successively calculates a first difference between a current unit angle rotation time computed at a current position of the output shaft and a previous unit angle rotation time computed at a previous position of the output shaft that is a first rotational position before the current position and makes tentative detection of a misfire in the internal combustion engine when any of the successively calculated first differences is greater than the first threshold value, the first engine misfire final detection module specifies the first difference that is greater than the first threshold value as an object first difference and makes final detection of a misfire in the internal combustion engine when a ratio of a selected first difference among the successively calculated first differences to the object first difference is in a preset first range, the second engine misfire final detection module, after the prohibition of execution of the vibration control, successively calculates a second difference between a current unit angle rotation time computed at a current position of the output shaft and a previous unit angle rotation time computed at a previous position of the output shaft that is the first rotational position before the current position, makes tentative detection of a misfire in the internal combustion engine when any of the successively calculated second differences is greater than the second threshold value, and in response to the tentative detection of a misfire in the internal combustion engine, specifies the second difference that is greater than the second threshold value as an object second difference and makes final detection of a misfire in the internal combustion engine when a ratio of a selected second difference among the successively calculated second differences to the object second difference is in a preset second range that is different from the first range, and the third engine misfire final detection module, after the prohibition of execution of the rotation speed control, successively calculates a third difference between a current unit angle rotation time computed at a current position of the output shaft and a previous unit angle rotation time computed at a previous position of the output shaft that is the first rotational position before the current position, makes tentative detection of a misfire in the internal combustion engine when any of the successively calculated third differences is greater than the third threshold value, and in response to the tentative detection of a misfire in the internal combustion engine, specifies the third difference that is greater than the third threshold value as an object third difference and makes final detection of a misfire in the internal combustion engine when a ratio of a selected third difference among the successively calculated third differences to the object third difference is in a preset third range that is different from the first range and the second range. This arrangement ensures adequate final detection on the occurrence or the non-occurrence of a misfire in the internal combustion engine, depending upon execution or non-execution of the vibration control and upon execution or non-execution of the rotation speed control.

In another preferable application of the engine misfire detection apparatus according to the above aspect of the invention, the power output apparatus includes a second motor enabling input and output of power from and to the driveshaft and controls the motor and the second motor to perform the vibration control, and the second engine misfire final detection module outputs prohibition of execution of the vibration control by one motor between the motor and the second motor, makes final detection on the occurrence or the non-occurrence of a misfire in the internal combustion engine based on the computed unit angle rotation time after the prohibition of execution of the vibration control by the one motor, and in the event of no final detection of a misfire in the internal combustion engine, outputs prohibition of execution of the vibration control by the other motor between the motor and the second motor and makes final detection on the occurrence or the non-occurrence of a misfire in the internal combustion engine based on the computed unit angle rotation time after the prohibition of execution of the vibration control by the other motor.

In one preferable embodiment, the engine misfire detection apparatus according to the above aspect of the invention further has an air-fuel ratio detector that measures an air-fuel ratio as a ratio of a fuel to the air supplied to the internal combustion engine. In response to the tentative detection of a misfire in the internal combustion engine by the engine misfire tentative detection module, the first engine misfire final detection module makes final detection on the occurrence or the non-occurrence of a misfire in the internal combustion engine based on the computed unit angle rotation time and the measured air-fuel ratio. The first engine misfire final detection module may make no final detection of a misfire in the internal combustion engine when the measured air-fuel ratio is out of a specific range including a preset air-fuel ratio. The 'preset air-fuel ratio' may be, for example, a stoichiometric air-fuel ratio.

Another aspect of the invention pertains to an engine misfire detection method of detecting a misfire of an internal combustion engine in a power output apparatus that includes the internal combustion engine having an output shaft linked to a driveshaft and a motor enabling input and output of power from and to the output shaft of the internal combustion engine and ensures output of at least part of output power of the internal combustion engine to the driveshaft under vibration control of controlling the motor to reduce a vibration caused by operation of the internal combustion engine. The engine misfire detection method includes the steps of: (a) computing a unit angle rotation time required for rotation of the output shaft of the internal combustion engine by every predetermined unit rotation angle according to a rotational position of the output shaft of the internal combustion engine; (b) making tentative detection on occurrence or non-occurrence of a misfire in the internal combustion engine based on the computed unit angle rotation time; (c) in response to the tentative detection of a misfire in the internal combustion engine in the step (b), making final detection on the occurrence or the non-occurrence of a misfire in the internal combustion engine based on the computed unit angle rotation time; and (d) in the event of no final detection of a misfire in the internal combustion engine in the step (c), outputting prohibition of execution of the vibration control and, after the prohibition of execution of the vibration control, making final detection on the occurrence or the non-occurrence of a misfire in the internal combustion engine based on the computed unit angle rotation time.

The engine misfire detection method according to this aspect of the invention makes tentative detection on the occurrence or the non-occurrence of a misfire in the internal combustion engine, based on the unit angle rotation time that is required for rotation of the output shaft of the internal combustion engine by every predetermined unit rotation angle and is computed according to the rotational position of the output shaft of the internal combustion engine. In response to the tentative detection of a misfire in the internal combustion engine, the engine misfire detection method makes final detection on the occurrence or the non-occurrence of a misfire in the internal combustion engine, based on the computed unit angle rotation time. In the event of no final detection of a misfire in the internal combustion engine, the engine misfire detection method outputs prohibition of execution of the vibration control and, after the prohibition of execution of the vibration control, makes final detection on the occurrence or the non-occurrence of a misfire in the internal combustion engine, based on the computed unit angle rotation time. Even in the case of no final detection of a misfire in the internal combustion engine in execution of the vibration control, the engine misfire detection method makes final detection on the occurrence or the non-occurrence of a misfire in the internal combustion engine in non-execution of the vibration control. This arrangement desirably increases the detection frequency of misfires in the internal combustion engine.

BEST MODES OF CARRYING OUT THE INVENTION

One mode of carrying out the invention is discussed below as a preferred embodiment.

Figure 1:
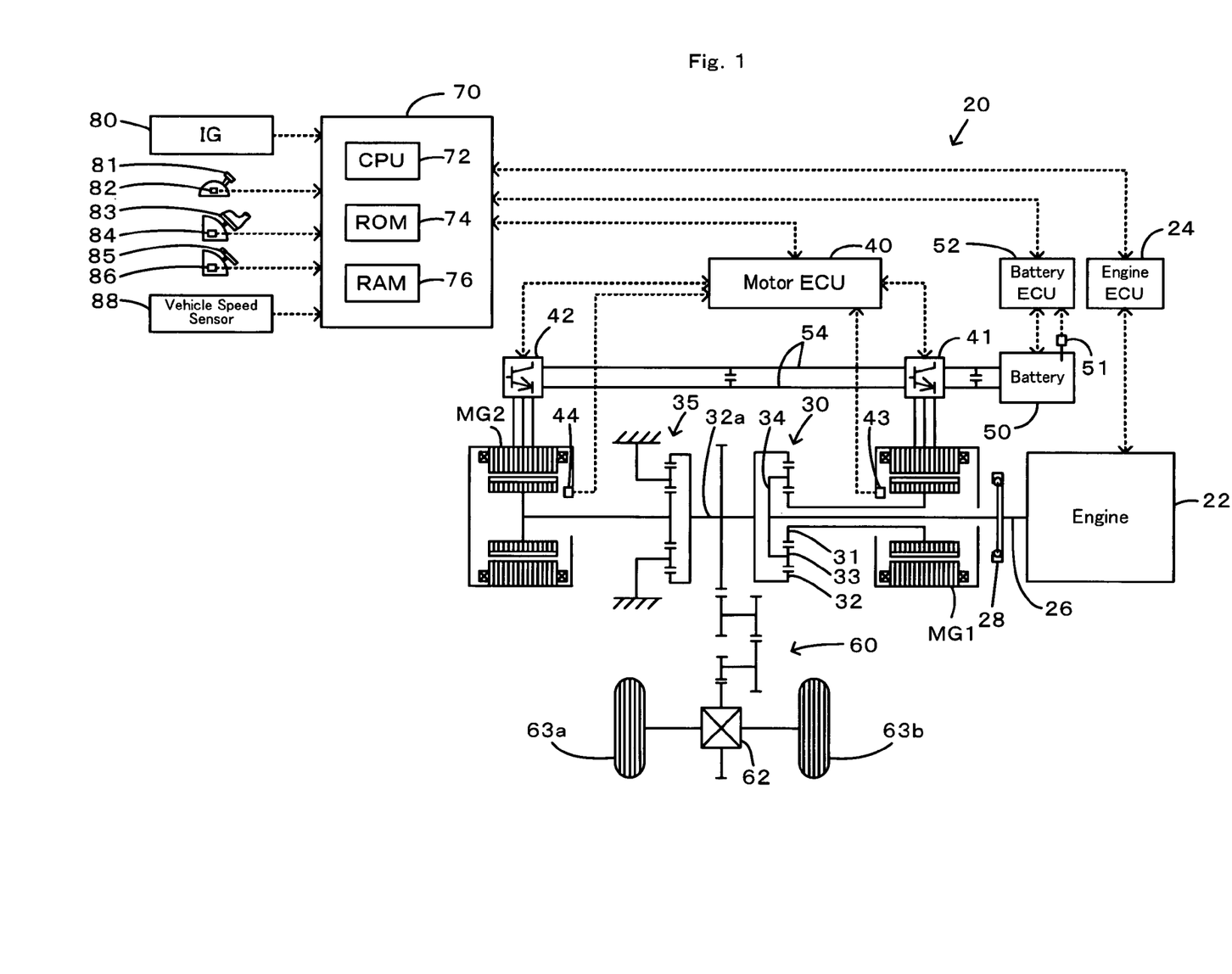
FIG. 1 schematically illustrates the configuration of a hybrid vehicle 20 equipped with an engine misfire detection apparatus for an internal combustion engine in one embodiment of the invention.

FIG. 1 schematically illustrates the construction of a hybrid vehicle 20 with an engine misfire detection apparatus for an internal combustion engine mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28 functioning as a torsion element, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole vehicle. In the structure of this embodiment, the engine electronic control unit 24 for controlling the operations of the engine 22 mainly functions as the engine misfire detection apparatus for the internal combustion engine.

Figure 2:
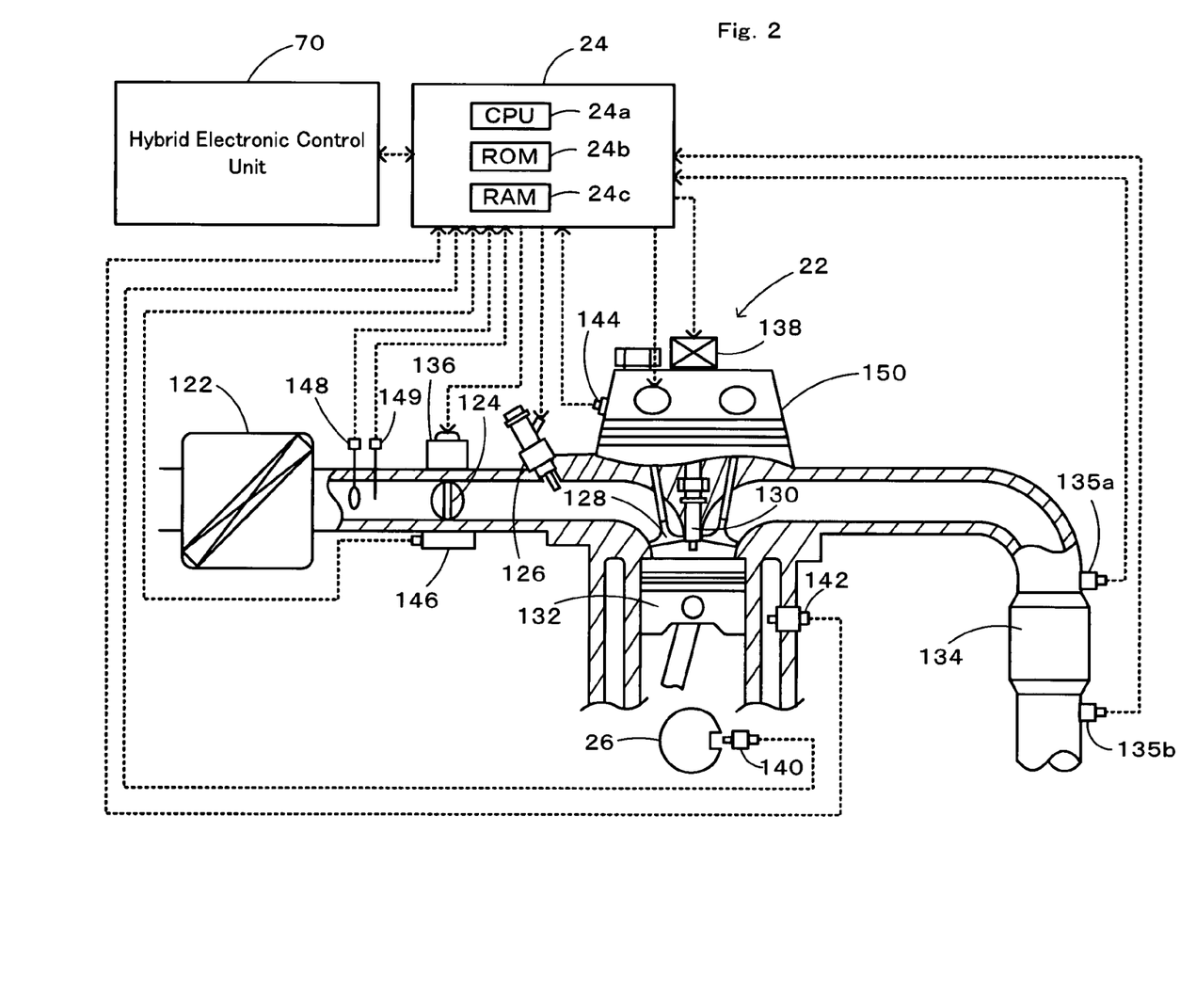
FIG. 2 shows the schematic structure of an engine 22.

The engine 22 is a six-cylinder internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 included in every cylinder to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 26. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air.

The engine 22 is under control of an engine electronic control unit 24 (hereafter referred to as engine ECU 24). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port (not shown), signals from various sensors that measure and detect the conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal from an air flow meter 148 attached to an air intake conduit, an intake air temperature from a temperature sensor 149 attached to the air intake conduit, an air-fuel ratio AF from an air-fuel ratio sensor 135a and an oxygen signal from an oxygen sensor 135b. The engine ECU 24 outputs, via its output port (not shown), diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a. During drive of the hybrid vehicle 20 of the embodiment with operation of the engine 22, for example, in the torque conversion drive mode or in the charge-discharge drive mode, the motor MG1 performs rotation speed control to operate the engine 22 at a target rotation speed corresponding to a torque demand, while the motors MG1 and MG2 perform vibration control to reduce the potential vibration caused by the operation of the engine 22. In the hybrid vehicle 20 driven in the torque conversion drive mode or in the charge-discharge drive mode, the hybrid electronic control unit 70 sets a target rotation speed Ne* and a target torque Te* of the engine 22 corresponding to a torque demand, and sets a torque command Tm1* of the motor MG1 corresponding to a rotation adjustment torque Tn for operating the engine 22 at the target rotation speed Ne* and a vibration control torque Tv1 for reducing the potential vibration of the engine 22. The hybrid electronic control unit 70 also sets a torque command Tm2* of the motor MG2 corresponding to a drive torque Td, which depends upon a difference between a torque demand and a torque output from the engine 22 to the ring gear shaft 32a via the power distribution integration mechanism 30 with output of a torque from the motor MG1, and a vibration control torque Tv2 for reducing the potential vibration of the engine 22. The hybrid electronic control unit 70 then sends the settings of the target rotation speed Ne* and the target torque Te* of the engine 22 to the engine ECU 24, while sending the settings of the torque commands Tm1* and Tm2* of the motors MG1 and MG2 to the motor ECU 40. The engine ECU 24 receives the target rotation speed Ne* and the target torque Te* and performs fuel injection control and ignition control to drive the engine 22 at an operation point defined by the combination of the target rotation speed Ne* and the target torque Te*. The motor ECU 40 receives the torque commands Tm1* and Tm2* and performs switching control of switching elements included in the inverters 41 and 42 to operate the motors MG1 and MG2 with the respective torque commands Tm1* and Tm2*.

Figure 3:
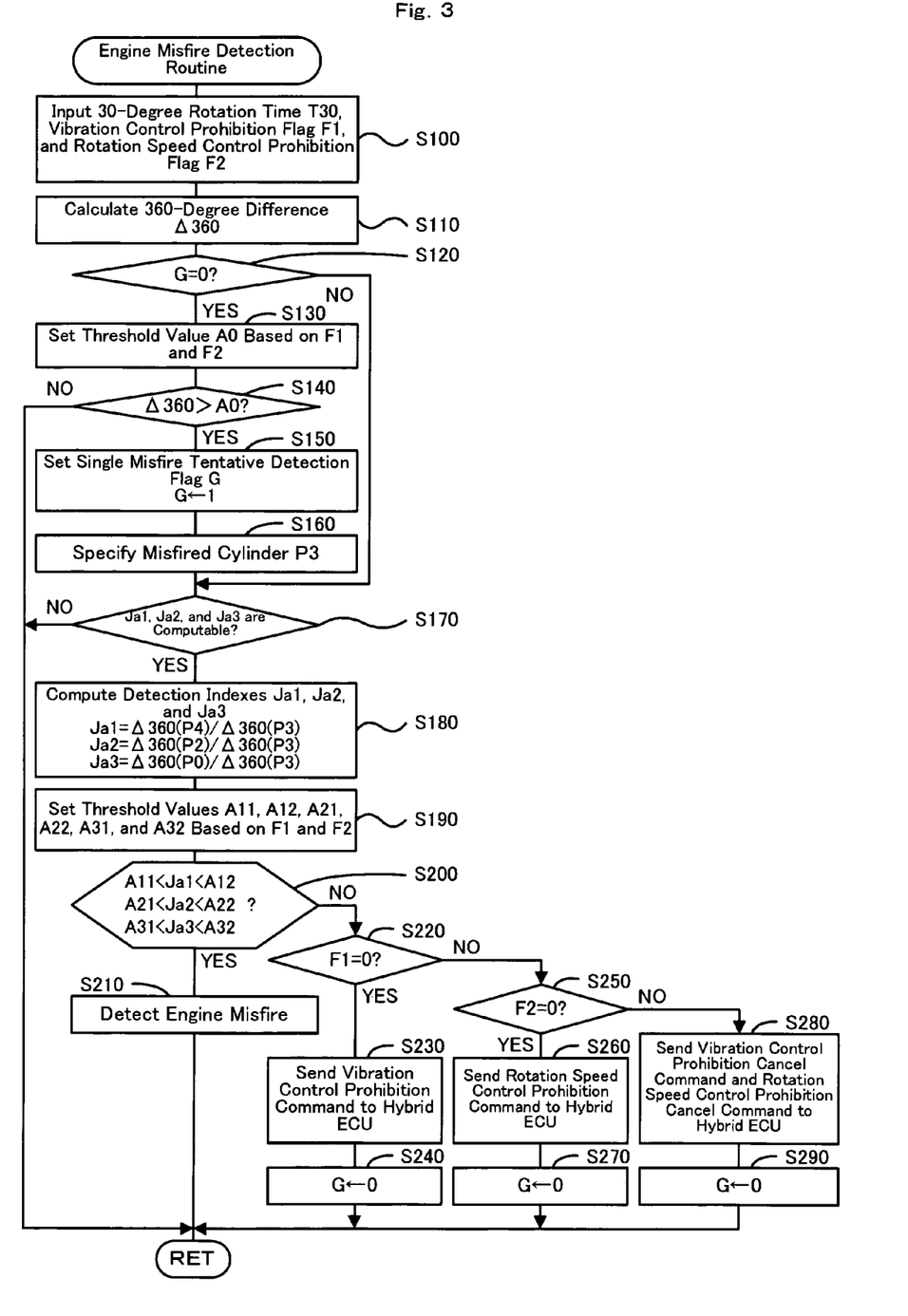
FIG. 3 is a flowchart showing an engine misfire detection routine executed by an engine ECU 24.

The following describes a series of operations to detect the occurrence or the non-occurrence of any misfired cylinder among the six cylinders of the engine 22 mounted on the hybrid vehicle 20 of the embodiment. FIG. 3 is a flowchart showing an engine misfire detection routine executed by the engine ECU 24. The engine misfire detection routine is performed repeatedly at preset time intervals during the operation of the engine 22. The description regards detection of a single engine misfire state having only one misfired cylinder among the six cylinders of the engine 22. It is assumed that the vibration control and the rotation speed control are under execution in a first cycle of this engine misfire detection routine.

Figure 4:
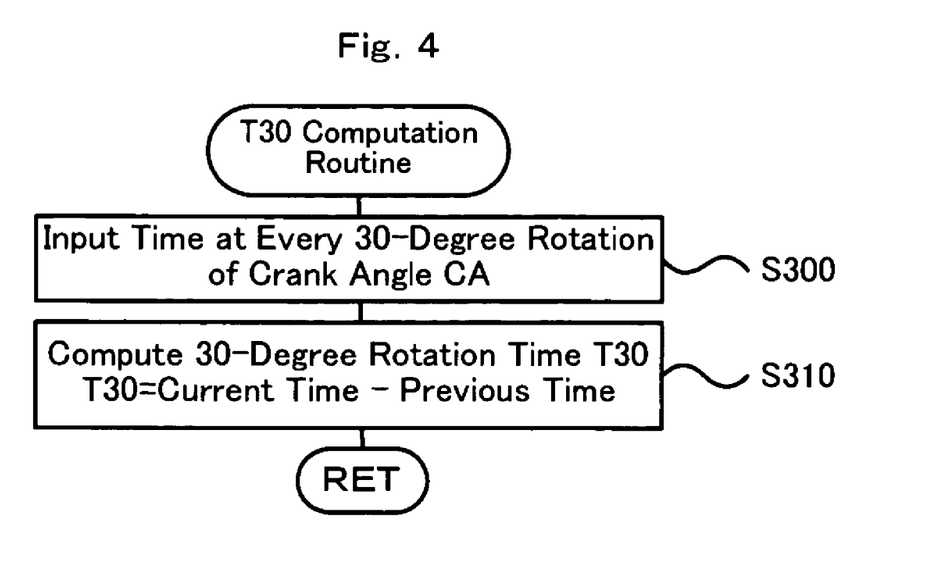
FIG. 4 is a flowchart showing a T30 computation routine.

On the start of the engine misfire detection routine, the CPU 24a of the engine ECU 24 first inputs a 30-degree rotation time T30 computed as a time period required for a 30-degree rotation of he crankshaft 26, a vibration control prohibition flag F1, and a rotation speed control prohibition flag F2 (step 5100). The 30-degree rotation time T30 is computed according to a T30 computation routine shown in the flowchart of FIG. 4. The T30 computation routine of FIG. 4 successively inputs the time at every 30-degree rotation of a crank angle CA detected by the crank position sensor 140 (step S300), computes the 30-degree rotation time T30 as a difference between the current time input at a current 30-degree rotation of the crank angle CA and the previous time input at a previous 30-degree rotation of the crank angle CA (step S310) and terminates the T30 computation routine. The vibration control prohibition flag F1 is set to 0 when the hybrid electronic control unit 70 gives permission for execution of the vibration control by the motors MG1 and MG2 to reduce the potential vibration caused by the operation of the engine 22. The vibration control prohibition flag F1 is set to 1 when the hybrid electronic control unit 70 prohibits the execution of the vibration control. The engine ECU 24 receives the setting of the vibration control prohibition flag F1 from the hybrid electronic control unit 70 by communication. The rotation speed control prohibition flag F2 is set to 0 when the hybrid electronic control unit 70 gives permission for execution of the rotation speed control by the motor MG1 to adjust the rotation speed of the engine 22. The rotation speed control prohibition flag F2 is set to 1 when the hybrid electronic control unit 70 prohibits the execution of the rotation speed control. The engine ECU 24 receives the setting of the rotation speed control prohibition flag F2 from the hybrid electronic control unit 70 by communication. Since the vibration control and the rotation speed control are being executed in the first cycle of this engine misfire detection routine, the vibration control prohibition flag F1 and the rotation speed control prohibition flag F2 input at step S100 are both equal to 0.

The CPU 24a of the engine ECU 24 subsequently calculates a 360-degree difference Δ360 of the input 30-degree rotation times T30 (step S110) and identifies the value of a single misfire tentative detection flag G (step S120). The 360-degree difference Δ360 is given as a difference between the currently input 30-degree rotation time T30 and a previous 30-degree rotation time T30 input 360 degrees before. The single misfire tentative detection flag G is set to 0 as an initial value and is set to 1 in response to tentative detection of a single misfire.

When the single misfire tentative detection flag G is equal to 0, the CPU 24a sets a threshold value A0 based on the settings of the vibration control prohibition flag F1 and the rotation speed control prohibition flag F2 (step S130) and compares the calculated 360-degree difference Δ360 with the set threshold value A0 (step S140). When the 360-degree difference Δ360 is not greater than the threshold value A0, the engine misfire detection routine is terminated immediately without any further processing. The threshold value A0 is empirically or otherwise determined as a criterion for tentative detection on the occurrence or the non-occurrence of a single misfire. In this embodiment, the threshold value A0 is set to increase in the order of the combination of the vibration control prohibition flag F1 and the rotation speed control prohibition flag F2 both equal to 0, the combination of the vibration control prohibition flag F1 equal to 1 and the rotation speed control prohibition flag F2 equal to 0, and the combination of the vibration control prohibition flag F1 and the rotation speed control prohibition flag F2 both equal to 1. This is because a rotation variation of the crankshaft 26 in non-execution of the vibration control and the rotation speed control is significantly greater than that in execution of the vibration control and the rotation speed control. If any fixed value is set to the threshold value A0 irrespective of execution or non-execution of the vibration control and the rotation speed control, the 360-degree difference Δ360 in a normally fired cylinder may exceed the threshold value A0 in non-execution of the vibration control and the rotation speed control. Namely the fixed threshold value A0 may cause inaccurate tentative detection of an engine misfire. In the current cycle, since the vibration control prohibition flag F1 and the rotation speed control prohibition flag F2 are both equal to 0, the threshold value A0 is set corresponding to this combination of the vibration control prohibition flag F1 and the rotation speed control prohibition flag F2.

Figure 5:
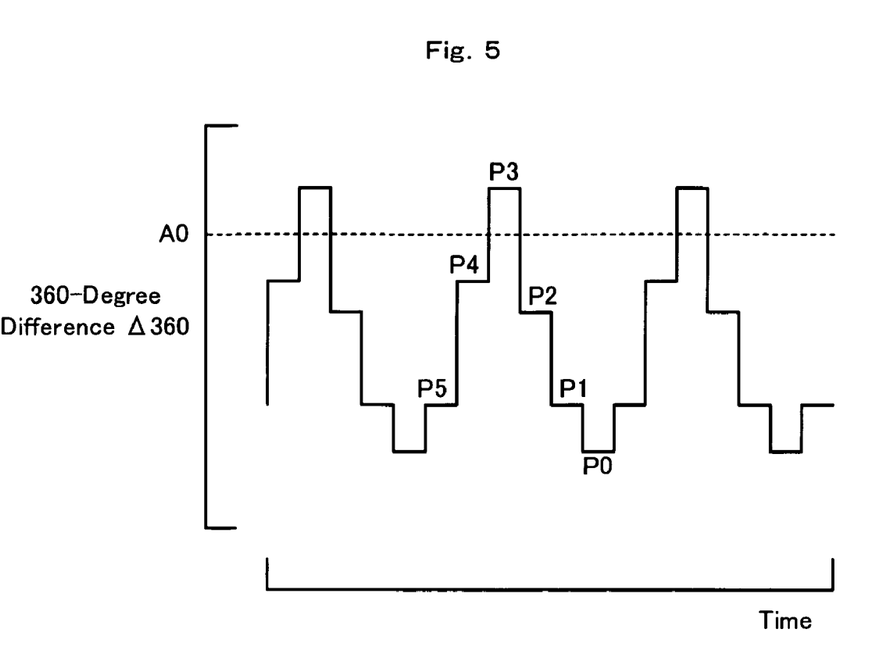
FIG. 5 shows a variation in 360-degree difference Δ360of a crank angle CA.

When the 360-degree difference Δ360 is greater than the threshold value A0, the CPU 24a makes tentative detection of a single misfire and sets the single misfire tentative detection flag G to 1 (step S150), and subsequently sets a cylinder as the object of tentative detection of the single misfire to a misfired cylinder P3 (step S160). In the six cylinder engine, explosive combustion of the air-fuel mixture takes place at the crank angle CA of every 120 degrees. The 360-degree difference Δ360 between a large 30-degree rotation time T30 for a misfired cylinder and a small 30-degree rotation time T30 for a normally fired cylinder is greater than the 360-degree difference Δ360 between 30-degree rotation times T30 for two normally fired cylinders. A peak of the 360-degree difference Δ360 thus substantially corresponds to a misfired cylinder. In this embodiment, a cylinder having a peak of the 360-degree difference Δ360 is specified as the misfired cylinder P3. FIG. 5 shows a variation in 360-degree difference Δ360 of the crank angle CA. In the illustrated example of FIG. 5, a cylinder corresponding to a peak of the 360-degree difference Δ360 is specified as the misfired cylinder P3. Cylinders explosively combusted immediately and second before the misfired cylinder P3 are respectively shown as pre-misfire cylinders P4 and P5. Cylinders explosively combusted immediately, second, and third after the misfired cylinder P3 are respectively shown as post-misfire cylinders P2, P1, and P0.

The CPU 24a subsequently determines whether detection indexes Ja1, Ja2, and Ja3 used for final detection on the occurrence or the non-occurrence of a single misfire are computable (step S170). Upon determination that the detection indexes Ja1, Ja2, and Ja3 are incomputable, the engine misfire detection routine is terminated immediately without any further processing. Computation of the detection indexes Ja1, Ja2, and Ja3 requires the 360-degree difference Δ360(P3) of the misfired cylinder P3 and the 360-degree differences Δ360 of the post-misfire cylinders explosively combusted after the misfired cylinder P3 as described later in detail. This is the reason for the computability determination of the detection indexes Ja1, Ja2, and Ja3. In a next cycle of this engine misfire detection routine, immediately after identification of the value of the single misfire tentative detection flag G equal to 1 at step S120, the CPU 24a determines whether the detection indexes Ja1, Ja2, and Ja3 are computable (step S170).

Upon determination at step S170 that the detection indexes Ja1, Ja2, and Ja3 are computable, the CPU 24a actually computes the detection indexes Ja1, Ja2, and Ja3 (step S180). The detection index Ja1 represents a ratio Δ360(P4)/Δ360(P3) of the 360-degree difference Δ360(P4) of the pre-misfire cylinder P4 explosively combusted immediately before the misfired cylinder P3 to the 360-degree difference Δ360(P3) of the misfired cylinder P3. The detection index Ja2 represents a ratio Δ360(P2)/Δ360(P3) of the 360-degree difference Δ360 (P2) of the post-misfire cylinder P2 explosively combusted immediately after the misfired cylinder P3 to the 360-degree difference Δ360(P3) of the misfired cylinder P3. The detection index Ja3 represents a ratio Δ360(P0)/Δ360(P3) of the 360-degree difference Δ360(P0) of the post-misfire cylinder P0 explosively combusted third after the misfired cylinder P3 to the 360-degree difference Δ360(P3) of the misfired cylinder P3. Threshold values A11, A12, A21, A22, A31, and A32 used for final detection on the occurrence or the non-occurrence of a single misfire are then set based on the settings of the vibration control prohibition flag F1 and the rotation speed control prohibition flag F2 (step S190). It is then determined whether the computed detection indexes Ja1, Ja2, and Ja3 are respectively in a range defined by the threshold values A11 and A12, in a range defined by the threshold values A21 and A22, and in a range defined by the threshold values A31 and A32 (step S200). The threshold values A11 and A12 are given respectively as a lower limit and an upper limit in a range of the ratio Δ360(P4)/Δ360(P3) of the 360-degree difference Δ360(P4) of the pre-misfire cylinder P4 explosively combusted immediately before the misfired cylinder P3 to the 360-degree difference Δ360(P3) of the misfired cylinder P3. The threshold values A21 and A22 are given respectively as a lower limit and an upper limit in a range of the ratio Δ360 (P2)/Δ360(P3) of the 360-degree difference Δ360(P2) of the post-misfire cylinder P2 explosively combusted immediately after the misfired cylinder P3 to the 360-degree difference Δ360(P3) of the misfired cylinder P3. The threshold values A31 and A32 are given respectively as a lower limit and an upper limit in a range of the ratio Δ360(P0)/Δ360(P3) of the 360-degree difference Δ360(P0) of the post-misfire cylinder P0 explosively combusted third after the misfired cylinder P3 to the 360-degree difference Δ360(P3) of the misfired cylinder P3. The threshold values A11, A12, A21, A22, A31, and A32 are experimentally or otherwise determined according to the settings of the vibration control prohibition flag F1 and the rotation speed control prohibition flag F2. As in the case of setting the threshold value A0, since the state of the rotation change of the crankshaft 26 depends upon execution or non-execution of the vibration control and the rotation speed control, the threshold values A11, A12, A21, A22, A31, and A32 are set based on the settings of the vibration control prohibition flag F1 and the rotation speed control prohibition flag F2. In the current cycle, since the vibration control prohibition flag F1 and the rotation speed control prohibition flag F2 are both equal to 0, the threshold values A11, A12, A21, A22, A31, and A32 are set corresponding to this combination of the vibration control prohibition flag F1 and the rotation speed control prohibition flag F2.

When the computed detection indexes Ja1, Ja2, and Ja3 are respectively in the range defined by the threshold values A11 and A12, in the range defined by the threshold values A21 and A22, and in the range defined by the threshold values A31 and A32, the CPU 24a makes final detection of a single misfire (step S210) and terminates the engine misfire detection routine. When any of the computed detection indexes Ja1, Ja2, and Ja3 is out of the range defined by the threshold values A11 and A12, the range defined by the threshold values A21 and A22, or the range defined by the threshold values A31 and A32, the CPU 24a does not make final detection of a single misfire but checks the value of the vibration control prohibition flag F1 (step S220). In this cycle, since the vibration control prohibition flag F1 is set equal to 0, the CPU 24a sends a vibration control prohibition command to the hybrid electronic control unit 70 (step S230), sets the single misfire tentative detection flag G to 0 (step S240), and terminates the engine misfire detection routine. The hybrid electronic control unit 70 identifies prohibition of the execution of the vibration control in response to reception of the vibration control prohibition command, sets the vibration control prohibition flag F1 to 1, and calculates the torque commands Tm1* and Tm2* of the motors MG1 and MG2 without taking into account the vibration control torques Tv1 and Tv2.

In a next cycle of the engine misfire detection routine, in response to input of the vibration control prohibition flag F1 set to 1 (step S100), the threshold value A0 is set corresponding to the combination of the vibration control prohibition flag F1 set to 1 and the rotation speed control prohibition flag F2 set to 0 (step S130). The CPU 24a successively sets the cylinder having the 360-degree difference Δ360 over the newly set threshold value A0 as the misfired cylinder P3 (steps S140 to S160), computes the detection indexes Ja1, Ja2, and Ja3 (step S180), and sets the threshold values A11, A12, A21, A22, A31, and A32 corresponding to the combination of the vibration control prohibition flag F1 set to 1 and the rotation speed control prohibition flag F2 set to 0 (step S190). The CPU 24a then determines whether the computed detection indexes Ja1, Ja2, and Ja3 are respectively in the range defined by the newly set threshold values A11 and A12, in the range defined by the newly set threshold values A21 and A22, and in the range defined by the newly set threshold values A31 and A32 (step S200). Upon determination that the computed detection indexes Ja1, Ja2, and Ja3 are respectively in the range defined by the threshold values A11 and A12, in the range defined by the threshold values A21 and A22, and in the range defined by the threshold values A31 and A32, the CPU 24a makes final detection of a single misfire (step S210) and terminates the engine misfire detection routine. The procedure of this embodiment makes final detection on the occurrence or the non-occurrence of a single misfire in non-execution of the vibration control when there is no final detection of a single misfire in execution of the vibration control and the rotation speed control. This arrangement desirably increases the detection frequency of single misfires, compared with the conventional procedure of terminating detection of a single misfire when there is no final detection of a single misfire in execution of the vibration control and the rotation speed control. Upon determination at step S200 that any of the computed detection indexes Ja1, Ja2, and Ja3 is out of the range defined by the threshold values A11 and A12, the range defined by the threshold values A21 and A22, or the range defined by the threshold values A31 and A32, on the other hand, the CPU 24a does not make final detection of a single misfire but checks the value of the vibration control prohibition flag F1 (step S220). In this cycle, since the vibration control prohibition flag F1 is set equal to 1, the CPU 24a subsequently checks the value of the rotation speed control prohibition flag F2 (step S250). In this cycle, since the rotation speed control prohibition flag F2 is set equal to 0, the CPU 24a sends a rotation speed control prohibition command to the hybrid electronic control unit 70 (step S260), sets the single misfire tentative detection flag G to 0 (step S270), and terminates the engine misfire detection routine. The hybrid electronic control unit 70 identifies prohibition of the execution of the rotation speed control in response to reception of the rotation speed control prohibition command, sets the rotation speed control prohibition flag F2 to 1 with the vibration control prohibition flag F1 kept to 1, and calculates the torque command Tm1* of the motor MG1 without taking into account the vibration control torque Tv1 and the rotation adjustment torque Tn. In this case, the torque command Tm1* of the motor MG1 is set equal to 0. There is no torque output from the motor MG1, so that the power of the engine 22 is not output to the ring gear shaft 32a or the driveshaft.

In a subsequent cycle of the engine misfire detection routine, in response to input of the rotation speed control prohibition flag F2 set to 1 (step S100), the threshold value A0 is set corresponding to the combination of the vibration control prohibition flag F1 and the rotation speed control prohibition flag F2 both set to 1 (step S130). The CPU 24a successively sets the cylinder having the 360-degree difference Δ360 over the newly set threshold value A0 as the misfired cylinder P3 (steps S140 to S160), computes the detection indexes Ja1, Ja2, and Ja3 (step S180), and sets the threshold values A11, A12, A21, A22, A31, and A32 corresponding to the combination of the vibration control prohibition flag F1 and the rotation speed control prohibition flag F2 both set to 1 (step S190). The CPU 24a then determines whether the computed detection indexes Ja1, Ja2, and Ja3 are respectively in the range defined by the newly set threshold values A11 and A12, in the range defined by the newly set threshold values A21 and A22, and in the range defined by the newly set threshold values A31 and A32 (step S200). Upon determination that the computed detection indexes Ja1, Ja2, and Ja3 are respectively in the range defined by the threshold values A11 and A12, in the range defined by the threshold values A21 and A22, and in the range defined by the threshold values A31 and A32, the CPU 24a makes final detection of a single misfire (step S210) and terminates the engine misfire detection routine. The procedure of this embodiment makes final detection on the occurrence or the non-occurrence of a single misfire in non-execution of the rotation speed control when there is no final detection of a single misfire in execution of the rotation speed control. This arrangement desirably increases the detection frequency of single misfires, compared with the conventional procedure of terminating detection of a single misfire when there is no final detection of a single misfire in execution of the rotation speed control. Upon determination at step S200 that any of the computed detection indexes Ja1, Ja2, and Ja3 is out of the range defined by the threshold values A11 and A12, the range defined by the threshold values A21 and A22, or the range defined by the threshold values A31 and A32, on the other hand, the CPU 24a does not make final detection of a single misfire but checks the values of the vibration control prohibition flag F1 and the rotation speed control prohibition flag F2 (steps S220 and S250). In this cycle, since the vibration control prohibition flag F1 and the rotation speed control prohibition flag F2 are both set equal to 1, the CPU 24a sends a vibration control prohibition cancel command and a rotation speed control prohibition cancel command to the hybrid electronic control unit 70 (step S280), sets the single misfire tentative detection flag G to 0 (step S290), and terminates the engine misfire detection routine. The hybrid electronic control unit 70 identifies permission for the execution of both the vibration control and the rotation speed control in response to reception of the vibration control prohibition cancel command and the rotation speed control prohibition cancel command, and sets the torque commands Tm1* and Tm2* of the motors MG1 and MG2 with taking into account the vibration control torques Tv1 and Tv2 and the rotation adjustment torque Tn. When there is no final detection of a single misfire under the settings of the vibration control prohibition flag F1 and the rotation speed control prohibition flag F2 both equal to 1, the procedure of the embodiment detects the non-occurrence of a single misfire and resumes the execution of the vibration control and the rotation speed control.

As described above, the engine misfire detection apparatus for the internal combustion engine mounted on the hybrid vehicle 20 of the embodiment makes tentative detection on the occurrence or the non-occurrence of a single misfire based on the 360-degree difference Δ360 of the 30-degree rotation time T30 computed as the time period required for every 30-degree rotation of the crankshaft 26. In response to tentative detection of a single misfire, the engine misfire detection apparatus makes final detection on the occurrence or the non-occurrence of a single misfire based on the 360-degree difference Δ360 of the 30-degree rotation time T30. When there is no final detection of a single misfire in execution of the vibration control and the rotation speed control, the engine misfire detection apparatus sends the vibration control prohibition command to the hybrid electronic control unit 70 and makes final detection on the occurrence or the non-occurrence of a single misfire in non-execution of the vibration control. When there is no final detection of a single misfire in non-execution of the vibration control, the engine misfire detection apparatus sends the rotation speed control prohibition command to the hybrid electronic control unit 70 and makes final detection on the occurrence or the non-occurrence of a single misfire in non-execution of both the vibration control and the rotation speed control. Even when there is no final detection of a single misfire in execution of the vibration control and the rotation speed control, the engine misfire detection apparatus of the invention makes final detection on the occurrence or the non-occurrence of a single misfire again in non-execution of the vibration control or in non-execution of both the vibration control and the rotation speed control. This arrangement desirably increases the detection frequency of single misfires. The threshold value A0 and the threshold values A11, A12, A21, A22, A31, and A32, which are set depending on the execution or the non-execution of the vibration control and the rotation speed control, are used for the tentative detection and the final detection on the occurrence or the non-occurrence of a single misfire of the engine 22. This arrangement ensures the adequate detection of a single misfire.

The above embodiment regards detection of a single misfire where only one cylinder among the six cylinders of the engine 22 is misfired. The engine misfire detection apparatus for the internal combustion engine mounted on the hybrid vehicle 20 is also applicable to detect engine misfires other than a single misfire, for example, consecutive misfires where two consecutive cylinders among the six cylinders of the engine 22 are misfired or intermittent misfires where two cylinders located across one fired cylinder among the six cylinders of the engine 22 are misfired. In such applications, the engine misfire detection technique desirably increases the detection frequency of engine misfires and ensures the adequate detection of engine misfires.

In the engine misfire detection apparatus for the internal combustion engine mounted on the hybrid vehicle 20 of the embodiment, when there is no final detection of an engine misfire in non-execution of the vibration control, the rotation speed control prohibition command is sent to the hybrid electronic control unit 70 to make final detection on the occurrence or the non-occurrence of an engine misfire in non-execution of both the vibration control and the rotation speed control. One modified procedure may detect the non-occurrence of any misfire in the engine 22 without sending the rotation speed control prohibition command to the hybrid electronic control unit 70.

In the engine misfire detection apparatus for the internal combustion engine mounted on the hybrid vehicle 20 of the embodiment, when there is no final detection of an engine misfire in execution of the vibration control and the rotation speed control regardless of the tentative detection of an engine misfire, the procedure of the embodiment makes tentative detection on the occurrence or the non-occurrence of a misfire of the engine 22 based on the 30-degree rotation time T30 and the threshold value A0 in non-execution of the vibration control and, in response to the tentative detection of an engine misfire, makes final detection on the occurrence or the non-occurrence of a misfire of the engine 22 based on the detection indexes Ja1, Ja2, and Ja3 and the threshold values A11, A12, A21, A22, A31, and A32. When there is no final detection of an engine misfire in execution of the vibration control and the rotation speed control, one modified procedure may not make tentative detection in non-execution of the vibration control or the rotation speed control but may immediately make final detection on the occurrence or the non-occurrence of a misfire of the engine 22 based on the detection indexes Ja1, Ja2, and Ja3 and the threshold values A11, A12, A21, A22, A31, and A32. In this modified procedure, the misfired cylinder P3 specified in response to the tentative detection of a misfire of the engine 22 in execution of the vibration control and the rotation speed control may be kept as the misfired cylinder P3, or a cylinder having a peak of the 360-degree difference Δ360 may be newly specified as the misfired cylinder P3. The procedure of the embodiment uses the threshold value A0 set depending on the execution or the non-execution of the vibration control and the rotation speed control. The threshold value A0 may, however, be fixed to a constant value regardless of the execution or the non-execution of the vibration control and the rotation speed control.

In the engine misfire detection apparatus for the internal combustion engine mounted on the hybrid vehicle 20 of the embodiment, in the case of the tentative detection of an engine misfire in execution of the vibration control and the rotation speed control, the procedure of the embodiment makes final detection of a misfire of the engine 22 when the detection indexes Ja1, Ja2, and Ja3 are respectively in the range defined by the threshold values A11 and A12, in the range defined by the threshold values A21 and A22, and in the range defined by the threshold values A31 and A32. An additional condition that the air-fuel ratio measured by an air-fuel ratio sensor 135*a* is within a specific range including a preset air-fuel ratio may be given for the final detection of a misfire of the engine 22. The preset air-fuel ratio may be a stoichiometric air-fuel ratio (about 14.7), and the specific range may be experimentally or otherwise determined.

In the engine misfire detection apparatus for the internal combustion engine mounted on the hybrid vehicle 20 of the embodiment, when there is no final detection of an engine misfire in execution of the vibration control and the rotation speed control regardless of the tentative detection of an engine misfire, the procedure of the embodiment makes final detection on the occurrence or the non-occurrence of a misfire of the engine 22 in non-execution of the vibration control by means of the motors MG1 and MG2. When there is no final detection of an engine misfire in execution of the vibration control and the rotation speed control, one modified procedure may make final detection on the occurrence or the non-occurrence of a misfire of the engine 22 in non-execution of the vibration control by one of the motors MG1 and MG2 (for example, the motor MG1) and execution of the vibration control by only the other of the motors MG1 and MG2 (for example, the motor MG2). In the case of no final detection of an engine misfire in this state, the modified procedure may make final detection on the occurrence or the non-occurrence of a misfire of the engine 22 in non-execution of the vibration control by any of the motors MG1 and MG2.

In the engine misfire detection apparatus for the internal combustion engine mounted on the hybrid vehicle 20 of the embodiment, both the motors MG1 and MG2 take charge of the vibration control. Only one of the motors MG1 and MG2 may alternatively take charge of the vibration control.

The engine misfire detection apparatus for the internal combustion engine mounted on the hybrid vehicle 20 of the embodiment makes the tentative detection and the final detection, based on the 360-degree differences Δ360 calculated from the 30-degree rotation time T30. The 360-degree differences Δ360 is, however, not essential for the tentative detection or the final detection of an engine misfire. A 60-degree difference Δ60 given as a difference between the currently input 30-degree rotation time T30 and a previous 30-degree rotation time T30 input 60 degrees before, a 120-degree difference Δ120 given as a difference between the currently input 30-degree rotation time T30 and a previous 30-degree rotation time T30 input 120 degrees before, or a 720-degree difference Δ720 given as a difference between the currently input 30-degree rotation time T30 and a previous 30-degree rotation time T30 input 720 degrees before may be used for the same purpose, in addition to or in place of the 360-degree differences Δ360.

The engine misfire detection apparatus for the internal combustion engine mounted on the hybrid vehicle 20 of the embodiment performs the tentative detection and the final detection of an engine misfire based on the 360-degree difference Δ360 of the 30-degree rotation time T30 computed as the time period required for every 30-degree rotation of the crankshaft 26. The 360-degree difference Δ360 is, however, not essential, but the engine misfire detection apparatus may perform the tentative detection and the final detection of an engine misfire based on any other T30-related factor or directly based on the 30-degree rotation time T30. The 30-degree rotation time T30 may be replaced by a 15-degree rotation time T15 computed as a time period required for every 15-degree rotation of the crankshaft 26 or by a 60-degree rotation time T60 computed as a time period required for every 60-degree rotation of the crankshaft 26.

The engine misfire detection apparatus mounted on the hybrid vehicle 20 of the embodiment detects a misfire of the six cylinder engine 22. The six cylinder engine is, however, not essential, but the engine misfire detection apparatus may be applicable to an internal combustion engine having any number of multiple cylinders, for example, a four cylinder engine or an eight cylinder engine.

Figure 6:
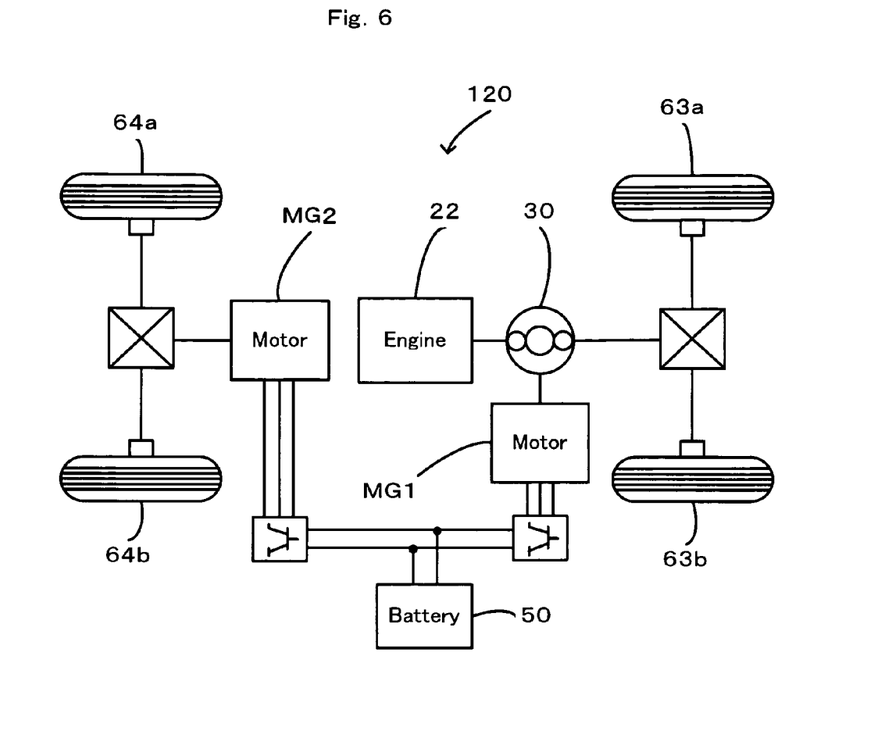
FIG. 6 schematically illustrates the configuration of another hybrid vehicle 120 in one modified example.
Figure 7:
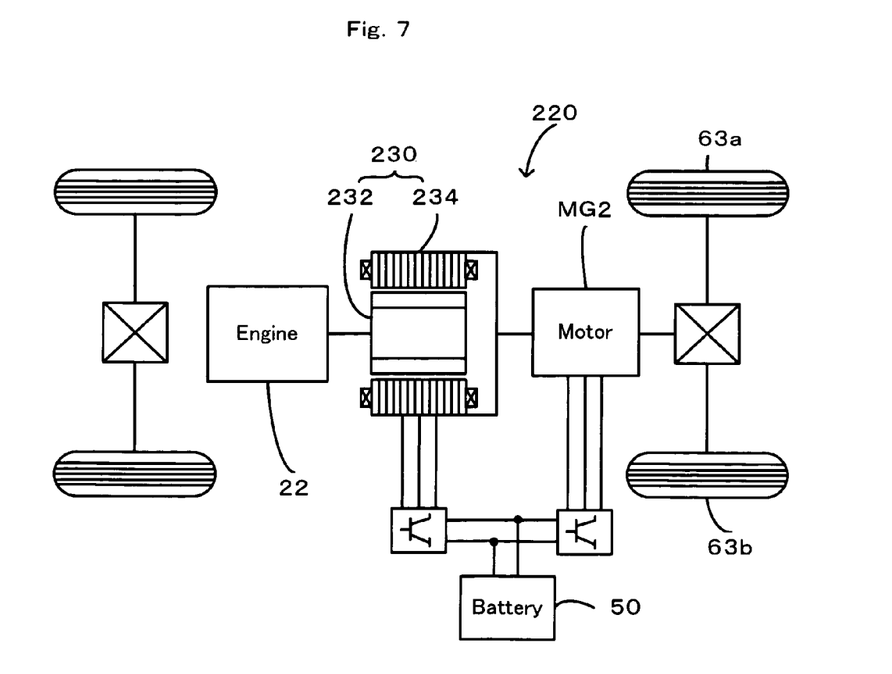
FIG. 7 schematically illustrates the configuration of still another hybrid vehicle 220 in another modified example.

The embodiment regards the engine misfire detection apparatus for the engine 22 mounted on the hybrid vehicle 20, which is equipped with the power distribution integration mechanism 30 connected to the crankshaft 26 of the engine 22, to the rotating shaft of the motor MG1, and to the ring gear shaft 32*a* or the driveshaft and with the motor MG2 connected to the ring gear shaft 32*a* via the reduction gear 35. The engine misfire detection apparatus for the engine 22 may be mounted on a hybrid vehicle 120 of one modified structure shown in FIG. 6. In the hybrid vehicle 120 of FIG. 6, the power of the motor MG2 is connected to another axle (an axle linked with wheels 64*a* and 64*b*) that is different from the axle connecting with the ring gear shaft 32*a* (the axle linked with the drive wheels 63*a* and 63*b*). The engine misfire detection apparatus for the engine 22 may also be mounted on a hybrid vehicle 220 of another modified structure shown in FIG. 7. The hybrid vehicle 220 of FIG. 7 is equipped with a pair-rotor motor 230. The pair-rotor motor 230 includes an inner rotor 232 connected to the crankshaft 26 of the engine 22 and an outer rotor 234 connected to a driveshaft of outputting power to the drive wheels 63*a* and 63*b*. The pair-rotor motor 230 transmits part of the output power of the engine 22 to the driveshaft, while converting the residual engine output power into electric power.

The embodiment described above regards the engine misfire detection apparatus adopted in the power output apparatus including the engine 22, the power distribution integration mechanism 30, and the motors MG1 and MG2. The power output apparatus is not restricted to this configuration. The engine misfire detection apparatus may be adopted in the power output apparatus of any configuration that includes an internal combustion engine having an output shaft linked to a driveshaft and a motor enabling input and output of power from and to the output shaft of the internal combustion engine and ensures output of at least part of the output power of the internal combustion engine to the driveshaft under vibration control of controlling the motor to reduce the potential vibration of the internal combustion engine.

The technique of the invention is not restricted to the engine misfire detection apparatus for the internal combustion engine mounted on the hybrid vehicle but may be actualized as the engine misfire detection apparatus for the internal combustion engine mounted on any of various vehicles and other moving bodies as well as for the internal combustion engine built in any of construction equipment and other stationary machinery. Another application of the invention is an engine misfire detection method for the internal combustion engine.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applied to the manufacturing industries of various equipment and apparatuses including a built-in internal combustion engine as well as automobiles equipped with an internal combustion engine.

What is claimed is:

1. An engine misfire detection method of detecting a misfire of an internal combustion engine in a power output apparatus that includes the internal combustion engine having an output shaft linked to a driveshaft and a motor enabling input and output of power from and to the output shaft of the internal combustion engine and ensures output of at least part of output power of the internal combustion engine to the driveshaft under vibration control of controlling the motor to reduce a vibration caused by operation of the internal combustion engine, the engine misfire detection method comprising:

(a) computing a unit angle rotation time required for rotation of the output shaft of the internal combustion engine by every predetermined unit rotation angle according to a rotational position of the output shaft of the internal combustion engine;

(b) making tentative detection on occurrence or non-occurrence of a misfire in the internal combustion engine based on the computed unit angle rotation time;

(c) in response to the tentative detection of a misfire in the internal combustion engine in the step (b), making final detection on the occurrence or the non-occurrence of a misfire in the internal combustion engine based on the computed unit angle rotation time; and (d) in the event of no final detection of a misfire in the internal combustion engine in the step (c), outputting prohibition of execution of the vibration control and, after the prohibition of execution of the vibration control, making final detection on the occurrence or the non-occurrence of a misfire in the internal combustion engine based on the computed unit angle rotation time.

2. An engine misfire detection apparatus of detecting a misfire of an internal combustion engine in a power output apparatus that includes the internal combustion engine having an output shaft linked to a driveshaft and a motor enabling input and output of power from and to the output shaft of the internal combustion engine and ensures output of at least part of output power of the internal combustion engine to the driveshaft under vibration control of controlling the motor to reduce a vibration caused by operation of the internal combustion engine, the engine misfire detection apparatus comprising:

a rotational position detector that detects a rotational position of the output shaft of the internal combustion engine;

a unit angle rotation time calculator that computes a unit angle rotation time required for rotation of the output shaft of the internal combustion engine by every predetermined unit rotation angle according to the detected rotational position;

an engine misfire tentative detection module that makes tentative detection on occurrence or non-occurrence of a misfire in the internal combustion engine based on the computed unit angle rotation time;

a first engine misfire final detection module that, in response to the tentative detection of a misfire in the internal combustion engine by the engine misfire tentative detection module, makes final detection on the occurrence or the non-occurrence of a misfire in the internal combustion engine based on the computed unit angle rotation time; and a second engine misfire final detection module that, in the event of no final detection of a misfire in the internal combustion engine by the first engine misfire final detection module, outputs prohibition of execution of the vibration control and, after the prohibition of execution of the vibration control, makes final detection on the occurrence or the non-occurrence of a misfire in the internal combustion engine based on the computed unit angle rotation time.

3. The engine misfire detection apparatus in accordance with claim 2, wherein the power output apparatus performs rotation speed control of controlling the motor to adjust a rotation speed of the internal combustion engine, the engine misfire detection apparatus further having:

a third engine misfire final detection module that, in the event of no final detection of a misfire in the internal combustion engine by the second engine misfire final detection module, outputs prohibition of execution of the rotation speed control and, after the prohibition of execution of the rotation speed control, makes final detection on the occurrence or the non-occurrence of a misfire in the internal combustion engine based on the computed unit angle rotation time.

4. The engine misfire detection apparatus in accordance with claim 2, wherein the power output apparatus includes a second motor enabling input and output of power from and to the driveshaft and controls the motor and the second motor to perform the vibration control, and the second engine misfire final detection module outputs prohibition of execution of the vibration control by one motor between the motor and the second motor, makes final detection on the occurrence or the non-occurrence of a misfire in the internal combustion engine based on the computed unit angle rotation time after the prohibition of execution of the vibration control by the one motor, and in the event of no final detection of a misfire in the internal combustion engine, outputs prohibition of execution of the vibration control by the other motor between the motor and the second motor and makes final detection on the occurrence or the non-occurrence of a misfire in the internal combustion engine based on the computed unit angle rotation time after the prohibition of execution of the vibration control by the other motor.

5. The engine misfire detection apparatus in accordance with claim 2, wherein the engine misfire tentative detection module makes tentative detection on the occurrence or the non-occurrence of a misfire in the internal combustion engine based on the computed unit angle rotation time and a preset first threshold value, and the second engine misfire final detection module, after the prohibition of execution of the vibration control, makes tentative detection on the occurrence or the non-occurrence of a misfire in the internal combustion engine based on the computed unit angle rotation time and a preset second threshold value that is different from the first threshold value, and in response to the tentative detection of a misfire of the internal combustion engine, makes final detection on the occurrence or the non-occurrence of a misfire in the internal combustion engine based on the computed unit angle rotation time.

6. The engine misfire detection apparatus in accordance with claim 5, wherein the engine misfire tentative detection module successively calculates a first difference between a current unit angle rotation time computed at a current position of the output shaft and a previous unit angle rotation time computed at a previous position of the output shaft that is a first rotational position before the current position and makes tentative detection of a misfire in the internal combustion engine when any of the successively calculated first differences is greater than the first threshold value, the first engine misfire final detection module specifies the first difference that is greater than the first threshold value as an object first difference and makes final detection of a misfire in the internal combustion engine when a ratio of a selected first difference among the successively calculated first differences to the object first difference is in a preset first range, and the second engine misfire final detection module, after the prohibition of execution of the vibration control, successively calculates a second difference between a current unit angle rotation time computed at a current position of the output shaft and a previous unit angle rotation time computed at a previous position of the output shaft that is the first rotational position before the current position, makes tentative detection of a misfire in the internal combustion engine when any of the successively calculated second differences is greater than the second threshold value, and in response to the tentative detection of a misfire in the internal combustion engine, specifies the second difference that is greater than the second threshold value as an object second difference and makes final detection of a misfire in the internal combustion engine when a ratio of a selected second difference among the successively calculated second differences to the object second difference is in a preset second range that is different from the first range.

7. The engine misfire detection apparatus in accordance with claim 2, wherein the power output apparatus performs rotation speed control of controlling the motor to adjust a rotation speed of the internal combustion engine, the engine misfire tentative detection module makes tentative detection on the occurrence or the non-occurrence of a misfire in the internal combustion engine based on the computed unit angle rotation time and a preset first threshold value, and the second engine misfire final detection module, after the prohibition of execution of the vibration control, makes tentative detection on the occurrence or the non-occurrence of a misfire in the internal combustion engine based on the computed unit angle rotation time and a preset second threshold value that is different from the first threshold value, and in response to the tentative detection of a misfire of the internal combustion engine, makes final detection on the occurrence or the non-occurrence of a misfire in the internal combustion engine based on the computed unit angle rotation time, the engine misfire detection apparatus further having:

a third engine misfire final detection module that, in the event of no final detection of a misfire in the internal combustion engine by the second engine misfire final detection module, outputs prohibition of execution of the rotation speed control, makes tentative detection on the occurrence or the non-occurrence of a misfire in the internal combustion engine based on the computed unit angle rotation time and a preset third threshold value that is different from the first threshold value and the second threshold value after the prohibition of execution of the rotation speed control, and in response to the tentative detection of a misfire in the internal combustion engine, makes final detection on the occurrence or the non-occurrence of a misfire in the internal combustion engine based on the computed unit angle rotation time.

8. The engine misfire detection apparatus in accordance with claim 7, wherein the engine misfire tentative detection module successively calculates a first difference between a current unit angle rotation time computed at a current position of the output shaft and a previous unit angle rotation time computed at a previous position of the output shaft that is a first rotational position before the current position and makes tentative detection of a misfire in the internal combustion engine when any of the successively calculated first differences is greater than the first threshold value, the first engine misfire final detection module specifies the first difference that is greater than the first threshold value as an object first difference and makes final detection of a misfire in the internal combustion engine when a ratio of a selected first difference among the successively calculated first differences to the object first difference is in a preset first range, the second engine misfire final detection module, after the prohibition of execution of the vibration control, successively calculates a second difference between a current unit angle rotation time computed at a current position of the output shaft and a previous unit angle rotation time computed at a previous position of the output shaft that is the first rotational position before the current position, makes tentative detection of a misfire in the internal combustion engine when any of the successively calculated second differences is greater than the second threshold value, and in response to the tentative detection of a misfire in the internal combustion engine, specifies the second difference that is greater than the second threshold value as an object second difference and makes final detection of a misfire in the internal combustion engine when a ratio of a selected second difference among the successively calculated second differences to the object second difference is in a preset second range that is different from the first range, and the third engine misfire final detection module, after the prohibition of execution of the rotation speed control, successively calculates a third difference between a current unit angle rotation time computed at a current position of the output shaft and a previous unit angle rotation time computed at a previous position of the output shaft that is the first rotational position before the current position, makes tentative detection of a misfire in the internal combustion engine when any of the successively calculated third differences is greater than the third threshold value, and in response to the tentative detection of a misfire in the internal combustion engine, specifies the third difference that is greater than the third threshold value as an object third difference and makes final detection of a misfire in the internal combustion engine when a ratio of a selected third difference among the successively calculated third differences to the object third difference is in a preset third range that is different from the first range and the second range.

9. The engine misfire detection apparatus in accordance with claim 2, the engine misfire detection apparatus further having:

an air-fuel ratio detector that measures an air-fuel ratio as a ratio of a fuel to the air supplied to the internal combustion engine, wherein in response to the tentative detection of misfire in the internal combustion engine by the engine misfire tentative detection module, the first engine misfire final detection module makes final detection on the occurrence or the non-occurrence of a misfire in the internal combustion engine based on the computed unit angle rotation time and the measured air-fuel ratio.

10. The engine misfire detection apparatus in accordance with claim 9, wherein the first engine misfire final detection module makes no final detection of a misfire in the internal combustion engine when the measured air-fuel ratio is out of a specific range including a preset air-fuel ratio.

\* \* \* \* \*